Oct. 5, 1937.   R. ANDERSON ET AL   2,094,776
VEHICLE AND DIRECTION INDICATOR THEREFOR
Original Filed March 22, 1933   4 Sheets—Sheet 1

INVENTORS
Robert Anderson
BY Samuel Anderson
James E. Sproell
ATTORNEY

Oct. 5, 1937. R. ANDERSON ET AL 2,094,776
VEHICLE AND DIRECTION INDICATOR THEREFOR
Original Filed March 22, 1933 4 Sheets-Sheet 2

Patented Oct. 5, 1937

2,094,776

UNITED STATES PATENT OFFICE 2,094,776

VEHICLE AND DIRECTION INDICATOR THEREFOR

Robert Anderson and Samuel Anderson, Seattle, Wash.

Application March 22, 1933, Serial No. 662,072
Renewed August 7, 1937

3 Claims. (Cl. 116—54)

This invention relates to improvements in vehicles and direction indicators therefor and aims primarily to provide a vehicle wherewith a direction indicator is combined in such a manner that when the latter is in a retracted or non-signalling position it blends or merges with the vehicle body, is fully protected against accidental dislodgment from the vehicle, is theft proof when the vehicle is parked and locked, and does not obstruct the view of the vehicle operator.

Broadly contemplated by the present invention is the provision of a vehicle having a recess or groove formed within the body thereof, and a direction indicator adapted to normally seat within said recess and to be moved outwardly therefrom to selected signalling positions.

With the foregoing in view the invention essentially resides and is more particularly concerned in the provision of a novel and improved combination of a vehicle and direction indicator, which in its preferred embodiment is characterized by the employment of a vehicle having an elongated recess or groove formed within the body thereof adjacent the left hand corner post of same; and a direction indicator mounted within said recess comprising an elongated luminous semaphore or signal arm seatable within the recess when retracted to a non-signalling position and adaptable to be moved outwardly therefrom to its various signalling positions, and mechanism for actuating the semaphore or signal arm from any point conveniently and readily accessible to the vehicle driver, said mechanism including detent means for yieldingly retaining the semaphore in any desired signalling position and also including means for initially setting the semaphore or resetting the latter relative to the operating lever thereof to insure of same positively seating within said recess at all times, all of which are important elements and features of the invention and are to be correlated in the broad aim of enhancing the efficiency of same, for the uses and purposes for which it is primarily designed and intended.

The above, and additional objects which will hereinafter be more specifically treated are attained by such means as are shown in the accompanying drawings, described in the following specification and then more clearly pointed out in the claims, which are appended hereto and form a part of this application.

With reference to the drawings, in which there are illustrated several embodiments of the invention, and throughout the several views of which like characters of reference designate similar parts.

Before taking up a more detailed description of the drawings, a general exposition of the specific purposes, functions and advantages of the novel and improved vehicle and direction indicator evolved by the present invention will be undertaken.

Many objections have been noted to the direction indicators heretofore employed upon vehicles, principally among which are: Their mode of construction and manner of attachment to their vehicles rendered the same unsightly and detracted materially from the appearance of the vehicles; in many instances when in fully retracted or non-signalling positions they projected considerably from their vehicles and in consequence were dislodged therefrom by tree limbs or the like passing between such direction indicators and their vehicles; they obstructed the view of the vehicle operators; they interfered with the cleaning or washing of the vehicles; and also they were not tamper or theft-proof when their vehicles were parked and locked.

Wherefore, it is the primary object and purpose of the present invention to overcome all of these objections and disadvantages by combining a direction indicator with a vehicle in a novel and improved manner, to thereby effectually and positively prevent the possibility of anything coming between the indicator and the vehicle, when the indicator is in a fully retracted non-signalling position within the vehicle; to provide an attractive combination which enhances and embellishes the appearance of the vehicle; to provide a tamper and theft-proof combination when the direction indicator is fully retracted within the vehicle and the latter is closed and locked; to provide a combination which will not interfere with the cleaning or washing of the vehicle; to provide a combination which positively and effectually insures of a clear and unobstructed view for the vehicle operator; and to provide a direction indicator which is rapidly and readily manipulated by the vehicle operator; which may be located or positioned at any desired or suitable point upon the vehicle; and which employs a luminous semaphore arm clearly visible day or night to traffic coming from any direction.

Figure 1:
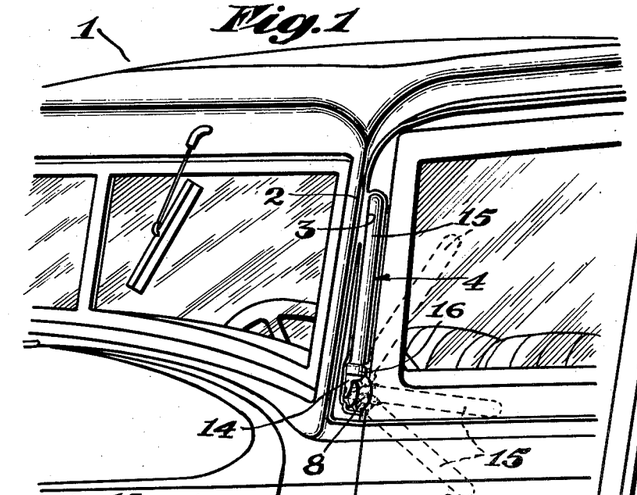
Figure 1 is a fragmentary perspective view of an automotive vehicle equipped with the direction indicator comprehended by the present invention.
Figure 2:
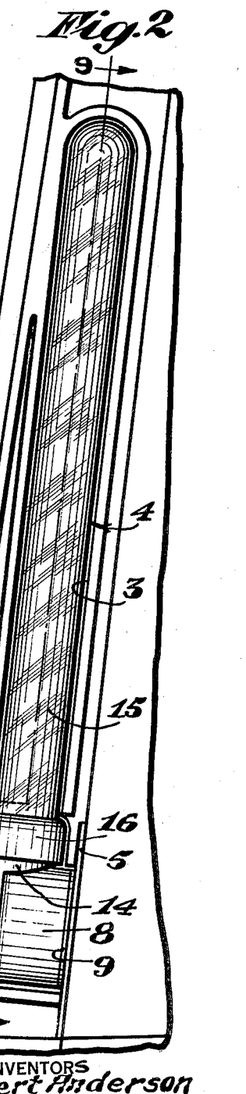
Fig. 2 is a side elevation of the direction indicator, as it would appear when in a retracted or non-signalling position within its recess.
Figures 3, 4, 5, 6:
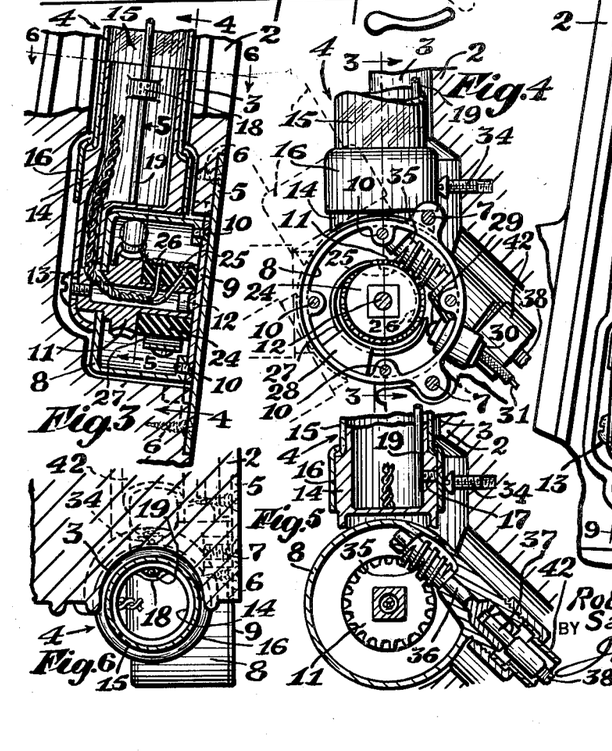
Fig. 3 is an enlarged fragmentary vertical longitudinal section of the lower portion of the direction indicator, taken substantially through 3—3 of Fig. 4.
Fig. 4 is a vertical transverse section of the same taken through 4—4 of Fig. 3, the several operative or signalling positions of the semaphore or signal arm being illustrated by dotted lines.
Fig. 5 is a similar section of the same taken through 5—5 of Fig. 3 to illustrate more clearly the worm gear actuating mechanism of the indicator.
Fig. 6 is a horizontal section taken through 6—6 of Fig. 3.

Beginning now the more detailed description of the invention by reference to the accompanying drawings, and referring here more particularly to Figs. 1 to 14, inclusive, the numeral 1 generally designates an automotive vehicle, of any well known type, the front left hand post 2 of which is provided with an elongated recess or groove 3, formed within the outer side of same substantially in spaced parallel relation to its rear face, as shown more clearly in Figs. 1, 2, 3 and 6, said recess 3 having an enlarged recessed lower end portion open longitudinally at its rear side to the rear face of the post 2, see Figs. 2 and 3, and also open transversely at its inner side to the interior of the vehicle, for purposes which will hereinafter be made more apparent.

Figures 7, 8, 9, 10, 11, 12, 13, 14:
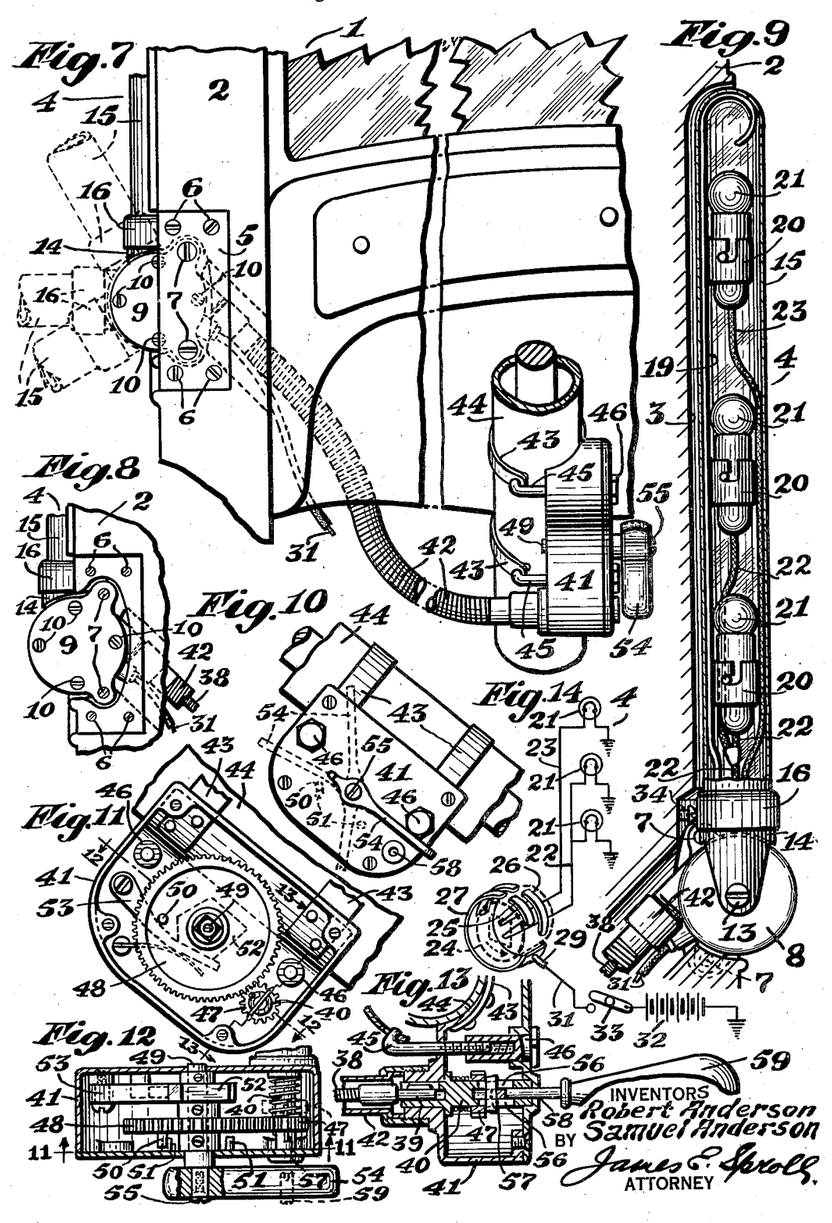
Fig. 7 is a side view of the indicator and its actuating mechanism, illustrating more clearly the manner of mounting the indicator within the left hand front post of the automotive vehicle body, also the manner of mounting the actuating mechanism thereof upon the vehicle steering post.
Fig. 8 is a fragmentary side view of the indicator and rear view of the vehicle post, with the anchoring or supporting plate of the indicator removed for clarity of illustration.
Fig. 9 is a vertical transverse section of the hollow transparent semaphore or signal arm taken through 9—9 of Fig. 2 and illustrating more clearly the manner of illuminating the same.
Fig. 10 is a front elevation of the indicator actuating mechanism.
Fig. 11 is a vertical longitudinal section of the same taken through 11—11 of Fig. 12.
Fig. 12 is a horizontal section thereof taken through 12—12 of Fig. 11.
Fig. 13 is an enlarged fragmentary vertical transverse section taken through 13—13 of Fig. 11.
Fig. 14 is a diagrammatic view of the illuminating or lighting circuit of the indicator.

Normally seating within the recess 3 and detachably secured at one end thereof to the post 2, within the enlarged lower end of said recess, is a direction indicator generally designated by the numeral 4 comprising an anchor plate 5 fitting or seating in flush relation within the rear face of the post 2, mortised for this purpose around the opening therein leading into the enlarged lower end of the recess 3, see Fig. 8, said anchor plate 5 being removably secured within said post by screws 6. Similarly secured by screws 7 to the inner face of the anchor plate 5, and extending forwardly therefrom into the enlarged lower end of the recess 3, is a relatively short cylindrical casing or hollow base 8 having an open rear end adapted to be normally closed by a disk-shaped closure plate 9, which latter is interposed between the anchor plate 5 and the casing 8, see Figs. 2 and 3, and with said casing is jointly and removably secured to said anchor plate by the screws 7, see Figs. 7 and 8, and in addition to said last mentioned screws is also independently and detachably secured to the casing 8, as by screws 10, see Figs. 3, 7 and 8.

Concentrically disposed and journalled for oscillative movement within the casing 8 is a tubular-shaped worm wheel 11 having a forwardly extending concentric hub journalled in and projecting through the forward end wall of said casing 8, see Fig. 3, for a purpose hereinafter described, and having a rearwardly extending concentric hub adapted at its rear end to normally abut the inner face of the closure plate 9 and to be journalled thereat upon a centering stub pin 12 axially disposed upon and extending forwardly from the inner face of said closure plate, see Fig. 3, said rearwardly extending hub, in the present instance, being preferably provided with a square exterior, see Figs. 4 and 5, for a purpose which will also hereinafter be described.

Detachably secured, as by a screw 13, to the projecting outer end of the forwardly extending hub of the worm wheel 11 is the offset and downwardly convergent hollow lower portion of a radially disposed oscillative tubular member 14, said lower portion, in the present instance, being adapted to encase and enclose the projecting end of said hub and to snugly abut the outer face of the forward end wall of the casing 8, to thereby form a substantially water-tight joint therebetween, while the upper or tubular portion of said member 14 is adapted to normally overlap the casing 8, in the manner more clearly illustrated in Figs. 2 and 3.

Snugly fitting or seating at its lower open end upon the exteriorly reduced or shouldered upper end of the tubular member 14 is a tubular semaphore or signal arm 15, which latter extends outwardly from the tubular member 14 in axial prolongation thereto and at its outer or closed end is preferably semi-spherical in formation, see Figs. 2 and 9. In the present instance, the semaphore arm 15 is preferably fabricated from substantially transparent or semi-transparent material, which will not readily break or shatter, such as, celluloid, or the like, said material being preferably red in color, in order to render the semaphore arm 15 more conspicuous during signalling operations, particularly at night. The semaphore arm 15 is adapted to be detachably secured at its lower open end to the tubular member 14, and for this purpose is peripherally or exteriorly shouldered, see Figs. 3 and 5, for abutment with the exteriorly shouldered upper end of said tubular member 14, and is maintained in abutment therewith by an interiorly shouldered collar or sleeve 16, which latter is adapted to snugly fit upon the upper tubular portion of the member 14, see Figs. 3 and 5, and to be detachably secured thereto by a screw 17, see Fig. 5.

Stamped from the material of the upper terminal portion of the tubular member 14, or otherwise formed upon the inner wall thereof, see Figs. 3 and 6, is an eye 18, through which extends and snugly fits a wire 19, which latter functions both as a conductor or ground wire and also as a lamp support, said wire for this purpose having its lower end normally in abutment or contact with the transversely disposed or offset wall of the tubular member 14, see Figs. 3 and 5, wherefrom it extends upwardly through the eye 18 and into the semaphore arm 15 for the entire length thereof, and at its upper or outer end is adapted to be curled inwardly and downwardly for abutment with the semi-spherical closed end of said semaphore arm 15, substantially in the manner illustrated in Fig. 9.

Fixedly secured at uniform spaced intervals upon the portion of the wire 19 extending within the semaphore arm 15 are sockets 20, see Fig. 9, within which fit or seat, in a well known manner, light bulbs or globes 21, it being here noted, that by reason of their connection with the wire 19, said sockets 20 and light bulbs 21 are grounded through such wire upon the vehicle 1. The innermost and intermediate light bulbs 21 are interconnected by a common lead or energy conducting wire 22, while the outermost light bulb 21 is provided with a separate or independent lead or energy conducting wire 23, which leads extend downwardly within the semaphore arm 15 from their respective sockets 20 and pass through the tubular member 14 into the tubular-shaped worm wheel 11, through an opening or aperture formed in the projecting end of the forwardly extending hub thereof, see Fig. 3, from whence they pass through the walls of the rearwardly extending square hub of said worm wheel 11, and through a sleeve 24 of insulating material, which snugly fits upon and is fixedly secured to said square hub for oscillative movement with said worm wheel 11. The lead 22 at its inner terminal is connected to an arcuate shoe or ring segment 25, while the inner terminal of the lead 23 is connected to a slightly longer arcuate shoe or ring segment 26, which shoes 25 and 26 are circumferentially seated in spaced parallel relation within the periphery of the insulating sleeve 24, with their forward or leading ends in alignment, substantially in the manner illustrated in Fig. 14.

Normally abutting the periphery of the insulating sleeve 24 and adapted to simultaneously contact with the forward or leading ends of the shoes 25 and 26 is the bifurcated free terminal of a substantially semi-circular brush 27, fabricated in the present instance from resilient or spring-like material, which brush is fixedly seated or secured, in any well known manner, approximately midway its length, to a block of insulation 28 similarly secured to the inner walls of the casing 8, see Fig. 4. Similarly abutting or contacting the other or opposite free terminal of the brush 27 is a radially disposed post 29 mounted within and insulated from the wall of the casing 8 by a sleeve 30, which post 29 is connected by a lead or conducting wire 31, extending inwardly and downwardly through the transversely open inner side of the enlarged lower end of the recess 3, see Figs. 4, 5, 7, 8 and 9, to the battery 32 of the vehicle 1, see Fig. 14, or to any other suitable source of electric energy. Interposed within the lead 31 is a switch 33 for rendering the lighting circuits of the semaphore arm 15 inactive during day driving if desired.

To positively and effectively regulate or control the uniform and proper seating of the semaphore arm 15 within its recess 3 an adjustable stop pin or screw 34 is provided, which latter for this purpose is threadedly mounted or engaged within the inner side wall of the enlarged recessed lower portion of the recess 3, in such a manner that the same will be abutted or contacted by the collar 16 when the semaphore arm 15 is fully retracted to a non-signalling position, see Figs. 4, 5 and 9.

Actuation or oscillation of the semaphore arm 15 is effected by mechanism which will now be described. Meshing with the worm wheel 11 is a worm 35 fixedly secured to a stub shaft 36 rotatively mounted at its terminals within bearings integrally formed or otherwise rigidly secured in spaced relation upon the interior walls of the casing 8, said shaft at its lower or outer end being connected by a coupling 37 to the upper end of a flexible shaft 38, which latter extends downwardly and inwardly from said coupling through the transversely open side of the enlarged lower end of the recess 3, see Figs. 4, 5, 7, 8 and 9, and at its lower end is connected by a similar coupling 39 to the outer end of a transversely disposed pinion shaft 40 having its terminal portions journalled for rotation within a sectional gear housing 41. A flexible tube or casing 42 threadedly secured or coupled at its upper end to the casing 8 and similarly secured or coupled at its lower end to the sectional housing 41 serves and functions to encase or enclose the flexible shaft 38 and thereby protect same against injury or damage, as will be manifest and apparent.

Fixedly secured in spaced parallel relation to the interior walls of the sectional housing 41, as by rivets or screws, and extending outwardly therefrom are clamping bands 43, substantially circular in shape, adapted to encircle the steering post 44 of the vehicle 1 and to have their free ends engaged by the hooked outer terminals of clamping screws 45, the inner threaded terminal portions of which extend into the sectional housing 41 and are threadedly engaged therein by interiorly threaded sleeves 46 rotatively mounted within the outer side wall of said housing, see Fig. 13, whereby the latter is positively and securely clamped to the steering post 44. In this connection, it may be well to state, that we have found it expedient in practice to shape that portion of the housing 41 abutting or contacting the steering post 44 to conform with the cylindrical contour of said post, as shown in Figs. 7 and 13, this in order to secure more effective and positive clamping action between the housing 41 and the post 44, as will be manifest and apparent.

Splined to and slidably mounted for axial movement upon the pinion shaft 40 is a spring-pressed spur gear pinion 47, which normally meshes with an oscillative spur gear 48 fixedly secured upon a transversely disposed shaft 49 journalled within the housing 41 in spaced parallel relation to said pinion shaft 40, said spur gear 48 having a rigid pin or stud 50 projecting from the outer face thereof adapted to contact or abut stop pins or studs 51 rigidly secured in spaced relation upon the inner wall of the housing 41 in the circular path of travel of the pin or stud 50, whereby oscillative movement of the spur gear 48 is limited and regulated, which movement controls and determines the full oscillative movement of the semaphore arm 15 from a non-signalling position through its various signalling positions to the limit of travel of same, as shown by dotted lines in Figs. 1, 4 and 7.

Fixedly secured to the shaft 49 in spaced parallel relation to the spur gear 48 is a detent or ratchet-like disk 52 having a series of flat faces formed upon its periphery adapted to be progressively or successively abutted or contacted, during oscillative movements of the spur gear 48, by a spring-pressed dog or pawl 53 pivotally mounted upon the interior walls of the housing 41, in the manner shown in Figs. 11 and 12. By referring to Fig. 11, it will be observed that the several flat faces of the disk 52 vary slightly in length and are disposed at slightly different angles relative to each other, this in order to compensate for the different amount of movement or travel of the semaphore arm 15, between the various signalling positions of same, as for example, when the semaphore arm 15 moves from a non-signalling position within its recess 3 to its first signalling position, indicated in dotted lines in Figs. 1, 4 and 7, the travel of said arm is relatively short, then when the same is moved from its first signalling position to its second signalling position the travel of such arm is comparatively longer, as shown in Figs. 1, 4 and 7, while, when the semaphore arm 15 is moved from its second signalling position to its third and final signalling position, the travel of same is again relatively short, hence the reason for the varying angles between said flat faces and the verying lengths of same. By thus providing these flat faces, on the disk 52 and abutting the same with the dog 53, in the manner herein shown and described, it will be obvious and apparent that the semaphore arm 15 is advanced step by step into its various signalling positions and is yieldingly retained therein, and also that the vehicle operator will know by the feel and sound of same, when the semaphore arm is in the selected signalling position without the necessity of diverting his attention from the driving of the vehicle.

The oscillative shaft 49 is adapted to project or extend at one end thereof from the housing 41, see Figs. 7 and 12, and is provided thereat with a square terminal upon which is mounted an oscillative actuating lever or handle 54 detachably secured thereto by an axially disposed countersunk screw 55 threadedly engaged within the outer end of said square terminal and having its countersunk head abutting or bearing upon the handle 54, see Fig. 12.

For initially setting or positioning the semaphore arm 15 in the recess 3, or for subsequently resetting the same therein as and when necessary, independently of and in relation to the fully retracted position of the lever or handle 54, the outer half portion of the pinion shaft 40 is preferably formed hollow as shown, said hollow portion having diametrically disposed slots 56 formed within the walls thereof, through which extends an axially sliding flat key 57 adapted to normally contact and abut the outer face of the spring-pressed pinion 47, in the manner illustrated in Figs. 12 and 13. The hollow portion of the pinion shaft 40 is normally disposed in axial alignment or registration with an aperture 58 formed in the adjacent or forward wall of the housing 41, see Figs. 10 and 13, through which aperture, during setting or resetting operations of the semaphore arm 15, is adapted to be inserted into the hollow portion of the pinion shaft 40 the stem of a tool 59 having a bifurcated terminal, see Fig. 13 and dotted lines in Fig. 12, which terminal is adapted to straddle the flat key 57, in the manner indicated in Fig. 13, so that when inward or end pressure is applied to the tool 59, such pressure is imparted through the flat key 57 to the spring-pressed pinion 47 causing inward axial movement of the same upon its shaft 40 and its disengagement from its correlated spur gear 48, as shown by dotted lines in Fig. 12, following which the tool 59 is rotated to rotate, through the medium of the flat key 57, the pinion shaft 40, flexible shaft 38, stub shaft 36 and worm 35, from which slight or partial rotative movement is imparted to the worm wheel 11, to effect inward movement of the tubular member 14 and semaphore arm 15 and abutment of the collar 16 with the stop pin 34, as shown in Figs. 4, 5 and 9, at which time said semaphore arm 15 is properly and positively seated within its recess 3 with the lever or handle 54 in a fully retracted position, see full lines in Fig. 10, and following each successive manipulation of the latter, said semaphore arm 15 will similarly seat within said recess 3, until such time as play or lost motion develops in the shafts or gears interposed between the semaphore arm 15 and the lever or handle 54, at which time the semaphore arm 15 is reset in the manner described above for initial setting of same. Upon completion of the semaphore arm setting, or resetting operation, the tool 59 is withdrawn, whereupon the spring-pressed pinion 47 will again engage or mesh with its complemental spur gear 48.

By referring to Figs. 10 to 12, inclusive, it will be noted and observed that oscillative movement of the lever or handle 54 and its correlated spur gear 48 is limited by the stop pin 50, on said spur gear, alternately abutting the stop pins 51 on the sectional casing 41, hence, it will be manifest and apparent, that if the above described mechanism or its equivalent, were not provided for effecting rapid and ready initial setting, or resetting, of the semaphore arm 15 within its recess 3, independently of and relative to the fully retracted position of the lever or handle 54, no amount of manipulation of the latter could or would be effective, in the event said semaphore arm 15 failed to properly or positively seat within its recess 3 following signalling operations, inasmuch as, the rear or left hand stop pin 51, when abutted by the stop pin 50, effectually prevents further retractive movement of the lever or handle 54, and in order to effect proper and positive seating of the semaphore arm 15 within its recess 3, without the above described setting and resetting mechanism, it would be necessary to dismantle the operating mechanism of the direction indicator 4 and reassemble same, which operation is slow and tedious.

In Figs. 1 to 9, inclusive, we have shown the recess 3 of a depth sufficient to accommodate substantially only one-half of the direction indicator 4, while the other half of same projects or protrudes from the vehicle body when in a full retracted non-signalling position, however, it is to be understood, that the recess may be made of any depth, that is to say deep enough to accommodate the entire direction indicator or any part thereof, as desired when the same is fully retracted. Further, in Figs. 7, 10, 11 and 13, and in the foregoing description, the actuating mechanism of the present direction indicator 4 has been illustrated and described as mounted upon the vehicle steering post 44, but, it is also to be understood, that such mechanism may be attached to the vehicle cowl or dash, or to any other convenient and accessible part of the vehicle 1, the present showing in each of the above instances being merely by way of illustration.

To actuate the direction indicator 4, the vehicle operator grasps the handle 54 and turns the same in a clockwise direction from its fully retracted position, illustrated in full lines in Fig. 10, to any of the desired signalling positions illustrated in dotted lines in Figs. 1, 4 and 7, the first dotted line position indicating a right turn, the second a left turn and the third a stop or parking position. The partial rotative or oscillative movement of the handle 54 is imparted through the spur gearing 47—48, pinion shaft 40, flexible shaft 38, stub shaft 36, worm 35 and worm wheel 11 to the semaphore arm 15, to thus move the latter to the desired signalling position, it again being here noted, that movements of the handle 54 are partially or slightly impeded by the detent disk 52 and that the clicking of the dog 53 on the flat surfaces of such disk serves to automatically indicate to the operator when the semaphore arm 15 is in the desired signalling position.

During initial angular movement of the semaphore arm 15 from a fully retracted position, as above described, the forward ends of the shoes 25 and 26 are brought into contact with the bifurcated terminal of the brush 27, thereby automatically closing the circuits 22—23 of the light bulbs 21, and with the switch 33 closed, as in night driving, the bulbs 21 are lighted to illuminate the semaphore arm 15 throughout its entire length. The shoes 25 and 26 remain in contact with the bifurcated terminal of the brush 27 until the semaphore arm 15 has almost reached its fully advanced position, when the shoe 25 passes out of contact with the brush 27, while the shoe 26 remains in contact therewith, whereby the outer end only of said semaphore arm 15 is illuminated by the outermost or terminal bulb 21, this for the purpose of furnishing a parking or stop light. Upon return movement of the actuating handle 54, the semaphore arm 15 is returned to its inactive position or point of rest with its lighting circuits 22—23 opened.

Figures 15, 16, 17, 18, 19, 20, 21:
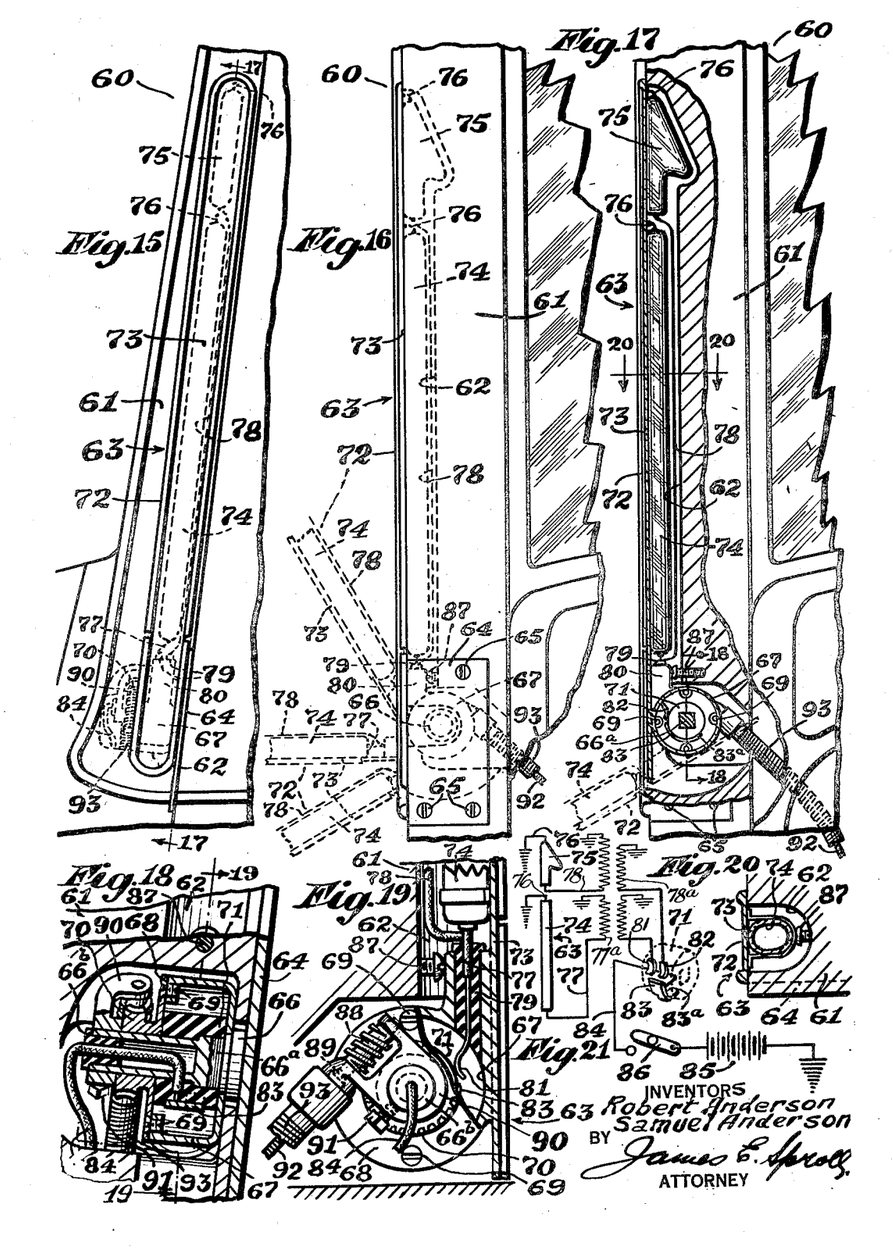
Fig. 15 is a side elevation of a slightly modified form of the direction indicator, as it would appear when in an enclosed or retracted non-signalling position within its recess.
Fig. 16 is a rear view thereof illustrating more clearly the manner of mounting the same within the left hand front post of the automotive vehicle body, the several operative or signalling positions of the semaphore or signal arm being illustrated in dotted lines.
Fig. 17 is a vertical transverse section taken through 17—17 of Fig. 15.
Fig. 18 is an enlarged fragmentary vertical longitudinal section of the lower portion of the indicator taken through 18—18 of Fig. 17.
Fig. 19 is a vertical transverse section of the same taken through 19—19 of Fig. 18, certain parts being broken away and certain other parts being shown in section for clarity of illustration.
Fig. 20 is a horizontal section taken through 20—20 of Fig. 17.
Fig. 21 is a diagrammatic view of the illuminating or lighting circuit of the modified form of indicator.

In the slightly modified form of vehicle and direction indicator illustrated in Figs. 15 to 21, inclusive, the numeral 60 generally designates an automotive vehicle, of any well known type, the front left hand post 61 thereof having an elongated recess or groove 62 formed within the outer side of same, substantially in spaced parallel relation to its rear face, as shown more clearly in Figs. 15, 18 and 20, said recess 62 having an enlarged recessed lower end portion open longitudinally at its rear side to the rear face of the post 61, see Figs. 16 and 18, and also open transversely at its inner side to the interior of the vehicle, see Figs. 16, 17 and 19, for purposes which will hereinafter be made more apparent.

Normally seating and enclosed within the recess 62 and detachably secured at one end thereof to the post 61 within the enlarged lower end of said recess, is a direction indicator generally designated by the numeral 63 comprising an anchor plate 64 fitting or seating in flush relation within the rear face of the post 61, mortised for this purpose around the opening therein leading into the enlarged lower end of the recess 62, see Figs. 16 and 18, said anchor plate 64 being removably secured within said post by screws 65.

Integrally formed or otherwise rigidly secured upon the inner face of the anchor plate 64 to extend inwardly and perpendicularly therefrom, through the opening in the rear face of the post 61 leading into the enlarged lower end of the recess 62, is a shouldered shaft or journal 66, upon the shouldered rear end of which is concentrically mounted for oscillative movement a relatively short cylindrical casing or hollow base 67, said casing being normally disposed within said enlarged lower end of the recess 62 and having an open forward end adapted to be normally closed by a disk-shaped closure plate 68 detachably secured thereto by screws 69, which closure plate upon its outer or forward face is provided with a worm wheel 70 integrally or otherwise rigidly secured thereto in concentric spaced relation, for a purpose which will shortly be described. Formed upon the shaft 66 adjacent its rear or shouldered end is a squared portion 66a, whereon normally seats and is fixedly secured one end of a stationary sleeve 71 of insulating material, which latter is concentrically disposed within the casing 67 for a purpose hereinafter set forth. The portion of the shaft 66 forwardly of its squared portion 66a is in the present instance preferably formed hollow or tubular and such hollow portion is adapted to extend through the sleeve 71 and worm wheel 70 and to project beyond the latter, substantially in the manner illustrated in Fig. 18, this for a purpose which will also hereinafter be made more apparent.

The numeral 72 generally designates a semaphore or signal arm, comprising a plate 73 and a series of elongated lighting elements 74 and 75, respectively, said elements in the present instances, being preferably in the form of neon tubes, and of a red color, which neon tubes are rigidly secured to the inner face of the plate, in any well known manner, as for example, by clamps or straps, see Figs. 19 and 20. The outer lighting element 75, for obvious reasons, is preferably shaped as an arrow head, substantially in the manner illustrated in Figs. 16, 17 and 21. The plate 73 in the present construction serves a dual purpose, that is to say, it forms and constitutes a support for the neon tubes 74—75 and functions therewith as the semaphore arm 72, also such plate functions as a closure for the recess 62, when the semaphore arm 72 is in a fully retracted non-signalling position, see Figs. 17 and 20, and for these reasons and purposes said plate 73 upon its inner face and adjacent its lower end is adapted to be integrally or otherwise rigidly connected to the periphery of the oscillative casing 67, see Fig. 19, for oscillation therewith, as will hereinafter be made more apparent. When the semaphore arm 72 is in a fully retracted non-signalling position, as above described, the major and wider portion of the plate 73 overlaps and abuts the edges of the recess 62, see Fig. 20, and thereby completely encloses the neon tubes 74—75 therein, but, from a point near the lower end of the lower neon tube 74, see Figs. 15, 16, 17 and 19, the width of the portion of said plate below said point is slightly reduced substantially to the width of the recess 62, this in order to permit said portion entering the enlarged lower end of said recess during signalling operations, in the manner indicated by dotted lines in Fig. 17, however, it is to be here noted, that such lower portion of the plate 73 is adapted to completely close said recess 62 and enclose the casing 67 therein, when the semaphore arm 72 is in its non-signalling position afore-mentioned, and as clearly illustrated in full lines in Figs. 16, 17 and 19.

The neon tubes 74—75 are adapted to be grounded at their upper ends to the plate 73, as by terminal connections 76, and at their opposite or lower ends are provided with downwardly extending leads or energy conducting wires 77 and 78, respectively, which leads at their lower ends extend into insulating bushings 79 seated in spaced parallel relation within a boss 80 exteriorly and integrally formed upon the casing 67, see Figs. 15, 16, 17 and 19. Interposed in the circuit wire 77 for the neon tube 74 is a transformer 77a and similarly interposed in the circuit wire 78 for the neon tube 75 is a transformer 78a. Connected, within the bushings 79, to the terminals of the leads 77—78 are resilient terminal brushes 81 and 82, respectively, see Fig. 21, which latter are adapted to project from said bushings into the casing 67, wherein they normally abut or contact with the periphery of the stationary insulating sleeve 71, see Fig. 19. Circumferentially seated within the periphery of the stationary sleeve 71, in the circular path of travel of the brushes 81—82, is a stationary arcuate shoe or ring segment 83, of sufficient width at its upper end to accommodate and simultaneously contact both of said brushes 81—82 during initial angular movement of the semaphore arm 72, while, at its lower or opposite end, said shoe 83 is provided with a portion 83a of reduced width, see Fig. 21, adapted to accommodate and contact with the brush 82 only, when the said semaphore arm 72 is in a fully advanced signalling position. The shoe 83 is connected by a lead or conducting wire 84 to the battery 85 of the vehicle 60, see Fig. 21, and for this purpose, see Fig. 18, said lead 84 extends inwardly from said shoe 83, through the walls of the sleeve 71 and the hollow portion of the shaft 66, thence through the latter to the forward end thereof, whereat said lead passes through an insulating bushing 66b seated within the outer end of said hollow portion, thence downwardly and inwardly from said bushing, through the transversely open inner side of the enlarged lower end of the recess 62 to said vehicle battery 85. Interposed within the lead 84 is a switch 86 for rendering the neon tubes 74—75 inactive during day driving.

To regulate and control the seating of the semaphore arm 72 within its recess 62, an adjustable stop pin or screw 87 is provided, which latter is threadedly mounted within the inner side wall of the recess 62 adjacent its enlarged lower end portion, in such a manner that the same will be normally contacted or abutted by the boss 80 of the casing 67, when the semaphore arm 72 is fully retracted to a non-signalling position, see Figs. 16, 17, 19 and 20.

Actuation or oscillation of the semaphore arm 72 is effected by the following described mechanism. Meshing with the worm wheel 70 is a worm 88 fixedly secured to a stub shaft 89 having its terminal portions journalled for rotation within a bifurcated bracket 90, see Figs. 18 and 19, which bracket is secured, as by a set screw 91 to the forward or projecting end of the stationary shouldered shaft 66, see Fig. 19. The stub shaft 89 is connected by a flexible shaft 92 to an actuating mechanism, not shown, which mechanism if desired may be identical in construction to that hereinbefore described for the direction indicator 4, and for this purpose, the flexible shaft 92 extends downwardly and inwardly from the stub shaft 89, through the transversely open side of the enlarged lower end of the recess 62, see Figs. 16, 17, 18 and 19, into the interior of the vehicle, and at its lower end is connected, as above stated to the selected type of actuating mechanism. A flexible tube or casing 93 threadedly secured at its upper end to the bracket 90 serves to encase the flexible shaft 92 and thus protect same against injury or damage.

The direction indicator 63 is actuated by rotating the flexible shaft 92, stub shaft 89 and worm 88, in any approved or desired manner, to effect partial rotation of the worm wheel 70 and thus move the semaphore arm 72, integrally connected therewith as hereinbefore set forth, to the desired signalling or angular position. During initial angular movement of the semaphore arm 72 from its fully retracted position within the recess 62, the brushes 81 and 82 simultaneously contact with the upper end and widest portion of the stationary shoe 83, thereby automatically closing the circuits 77 and 78 of the neon tubes 74 and 75, and with the switch 86 closed, as in night driving, the neon tubes 74 and 75 are lighted to illuminate the semaphore arm 72 throughout its entire length. The brushes 81 and 82 remain in contact with the shoe 83 until the semaphore arm 72 has almost reached its fully advanced position, when the brush 81 passes out of contact with the shoe 83, while the brush 82 remains in contact with the extension 83a of said shoe 83, whereby the outer end only of the semaphore arm 72 is illuminated by the neon tube 75, this for the purpose of furnishing a parking or stop light. Upon return movement of the semaphore arm 72 to its inactive position or point of rest within its recess 62, the lighting circuits 77 and 78 are again open, as will be obvious and apparent from the foregoing and by referring to the accompanying drawings.

By fabricating and mounting the direction indicator 63 upon the vehicle 60 in the manner herein shown and described, it will be manifest and evident that such indicator when in a fully retracted position within its recess 62 will blend and merge with the surface of the vehicle body and will not detract from the appearance or symmetry of the latter, but, rather enhance and embellish the appearance of said vehicle body.

Figures 22, 23, 24, 25, 26, 27, 28:
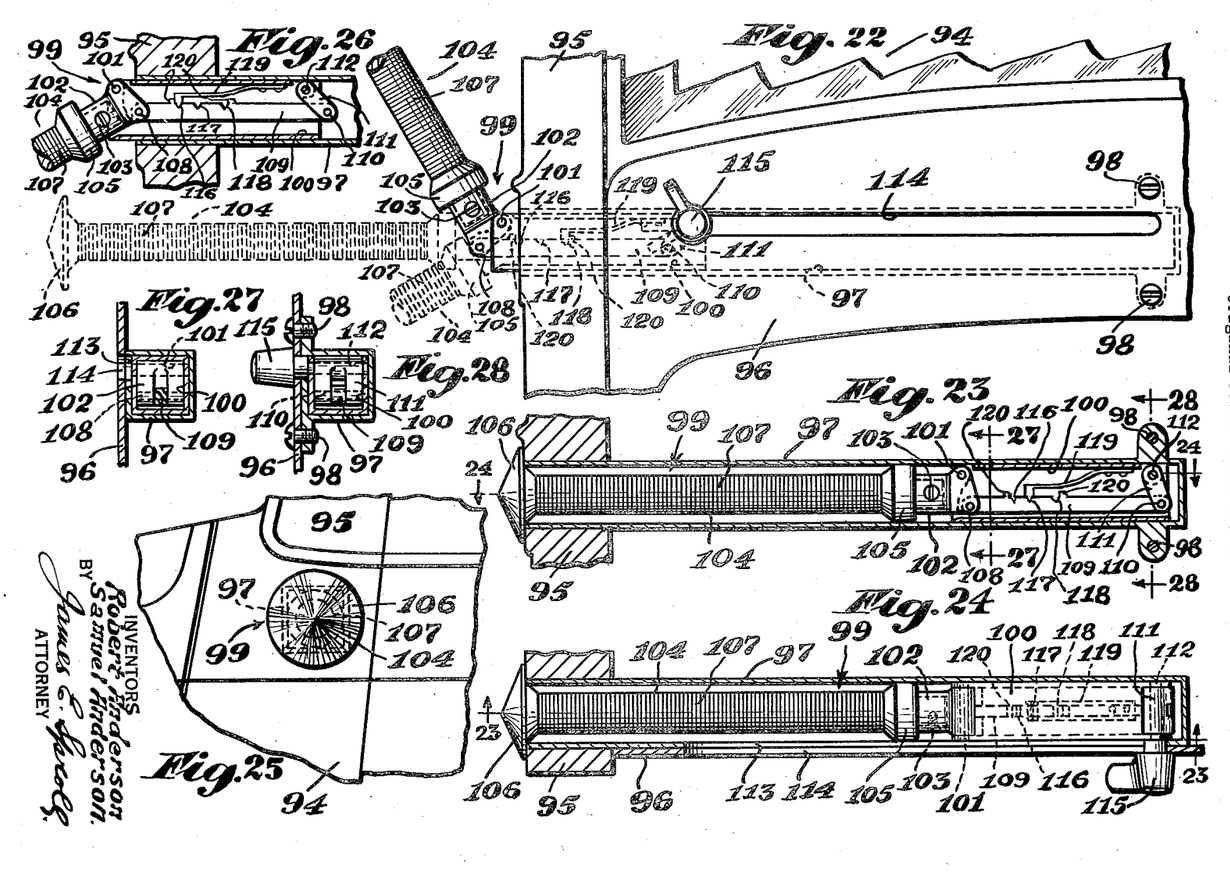
Fig. 22 is a rear view of another modified form of the direction indicator and its actuating mechanism, illustrating the manner of mounting the same within the left hand front post and upon the cowl or dash of the automotive vehicle, and also illustrating in full lines the semaphore or signal arm thereof advanced and elevated to indicate a right hand turn, with the other signalling positions of said semaphore or signal arm illustrated in dotted lines.
Fig. 23 is a vertical longitudinal section of the casing or housing of the indicator taken through 23—23 of Fig. 24, with the semaphore or signal arm illustrated in a fully retracted or non-signalling position therein.
Fig. 24 is a horizontal section of said casing taken through 24—24 of Fig. 23, with the semaphore in the same position therein.
Fig. 25 is a fragmentary side elevation of the automotive vehicle equipped with this modified form of direction indicator, the latter being illustrated in an enclosed or non-signalling position therein.
Fig. 26 is a fragmentary vertical longitudinal section of the indicator with the semaphore or signal arm thereof shown in an advanced and lowered position to indicate stop or parking of the vehicle.
Figs. 27 and 28 are vertical transverse sections taken through 27—27 and 28—28, respectively, of Fig. 23.

In the slightly modified form of vehicle and direction indicator illustrated in Figs. 22 to 28, inclusive, the numeral 94 generally designates an automotive vehicle, of any well known type, 95 the front left hand post thereof, and 96 the cowl or dash of same, the latter having a transversely disposed elongated casing or housing 97, preferably of rectangular cross-section, mounted upon its forward face, said casing at its outer open end being seated within and extending through the post 95, see Figs. 23, 24 and 25, and at its inner closed end being detachably secured, as by screws 98, to the forward face of the cowl or dash 96, see Figs. 22, 23 and 28.

Normally seating and slidably mounted within the casing 97 is a direction indicator generally designated by the numeral 99 comprising a sleeve 100 mounted for reciprocative movement within the casing 97, to the outer end and upper portion of which is pivotally connected, as by a pin 101, an outwardly projecting socket 102, wherein is detachably secured, as by a screw 103, the inner end of a reciprocative and oscillative cylindrical semaphore arm 104 provided adjacent said inner end with a guide collar or enlarged portion 105 and at its outer end with a conical head or cap 106, while, the intermediate or shank portion 107 thereof, is in the present instance, preferably painted with a luminous red paint, in order to render the semaphore arm 104 more conspicuous during signalling operations, especially at night.

The reciprocative and oscillative semaphore arm 104 and its complemental reciprocative sleeve 100 are mounted for free axial sliding movement within the casing 97, this in order to effect rapid and ready outward movement of said semaphore arm from within said casing to its initial or horizontal signalling position indicated in dotted lines in Fig. 22, in which position the semaphore arm 104 extends from the casing 97 in axial prolongation thereto, and from whence it is oscillated up or down to other signalling positions, in a manner which will shortly be described. During sliding or reciprocative movements of the semaphore arm 104 within the casing 97, said arm is adapted to be maintained and retained in axially aligned relation therein by its guide collar 105, the latter for this purpose having a free sliding or working fit within said casing, see Figs. 23 and 24, wherein said semaphore arm 104 is shown in a fully retracted non-signalling position, at which time, the conical head 106 thereof is in abutment with the outer face of the vehicle post 95 and is also seated within and completely closes the outer open end of the casing 97. Manifestly, therefore, with the semaphore arm 104 in the position just described, the direction indicator 99 is completely enclosed within the casing 97, with the exception of the conical head 106, which latter does not in any way detract from the appearance of symmetry of the vehicle body and may be provided upon its outer face with any desired or selected design to further enhance the appearance of said vehicle body.

Reciprocation and oscillation of the semaphore arm 104 is effected by mechanism which will now be described. Pivotally connected, as by a pin 108, to the inner end and bifurcated lower portion of the socket member 102 is one end of a swinging bar or link 109, which bar is normally disposed within and is co-extensive with the reciprocative sleeve 100, see Figs. 23 and 26, and at its opposite end is similarly connected, as by a pin 110, to the lower end of a depending oscillative arm 111 fixedly secured at its upper end to a shaft 112 mounted for oscillation within the inner end and upper portion of the sleeve 100, which shaft at its rear end is adapted to project therefrom through an elongated slot 113 formed lengthwise in the adjacent or rear wall of the casing 97 and also through a similar slot 114 formed within the cowl or dash 96 in alignment and registration with the slot 113, said slots 113 and 114 being disposed in transverse relation to the vehicle 94, as shown in Figs. 22 and 24. Fixedly secured to the rear or projecting terminal of the shaft 112 is an operating knob 115, the reduced or shouldered forward end of which extends through the slots 113 and 114 for abutment with the rear wall of the sleeve 100, see Figs. 24 and 28. Formed in spaced relation within the upper edge of the swinging bar 109, substantially midway the length thereof, are notches 116, 117 and 118, respectively, within which is adapted to selectively seat the free terminal of a resilient detent member 119 fixedly secured at its opposite terminal to the upper wall of the sleeve 100, as more clearly shown in Figs. 23 and 26, said notches and detent member being provided for the purpose of yieldingly retaining the semaphore arm 104 in any desired or selected signalling position, as will hereinafter be made more apparent. In this connection, it should be here noted, that the free terminal of the detent member 119 normally seats within the notch 117, see Fig. 23, when the semaphore arm 104 is disposed in axial alignment with the casing 97, and is only unseated therefrom, when said arm is oscillated to its up or down signalling positions illustrated in Figs. 22, and 26, at which time, said detent member terminal is seated within the notch 116 when the arm 104 is down or in the notch 118 when said arm is up. To positively limit oscillative movement of the semaphore arm 104 up or down from its initial horizontal position indicated in Fig. 22, the upper edge of the swinging bar 109 is provided adjacent the notches 116 and 118 with upwardly extending lugs 120 adapted to be alternately abutted by the free terminal of the detent member 119, when the semaphore arm 104 is at its limit of upward travel or movement, as illustrated in full lines in Fig. 22 or when the same is at its limit of downward travel as illustrated in full lines in Fig. 26.

In actuating the direction indicator 99, the vehicle operator grasps the knob 115 and moves the same from one end of the slots 113 and 114, see Fig. 24, to the opposite end of said slots, see Fig. 22, and in so doing causes the interconnected sleeve 100 and semaphore 104 to move outwardly in the casing 97 to the horizontal position indicated in dotted lines in Fig. 22, and if the vehicle is making a left turn, the semaphore arm is left in such position until completion of the turn, whereupon the operator moves the knob 115 to the inner end of the slots 113 and 114, thus withdrawing the semaphore arm 104 within the casing 97. However, with the semaphore arm 104 in its extended position, as above described, if a right hand turn is to be made the operator turns the knob 115 clockwise to the position indicated in Fig. 22, to thereby disengage the detent member 119 from the bar 109 and thus permit the latter to swing outwardly and in so doing elevate or raise the semaphore arm 104, through the medium of the socket member 102, to its right hand signalling position indicated in full lines, in Fig. 22, at which time the free terminal of the detent member 119 will drop into and seat within the notch 118, and simultaneously therewith the adjacent lug 120 on the bar 109 will abut said member and thus positively limit and prevent further outward swinging movement of said bar 109 and in consequence further upward swinging movement of the semaphore arm 104. With the free terminal of the detent member 119 seating in the notch 118 in the manner just described, the semaphore arm 104 is yieldingly maintained and retained in its elevated position, and when the right hand turning movement of the vehicle has been completed, the operator again grasps the knob 115 and turns same counter-clockwise, thereby releasing the free terminal of the detent member 119 from the notch 118 and thus permitting the bar 109 to swing inwardly and in so doing depress or lower the semaphore arm to its horizontal position, at which time the free terminal of the detent member drops into the notch 117, to thus yieldingly retain said semaphore arm in said horizontal position, whereupon the latter is withdrawn within the casing 97, in the manner hereinbefore described. Again, assuming that the semaphore arm 104 is in its advanced horizontal position, or initial signalling position, above described, and it is desired to move the same to a stop or parking position, then and in that event, the operator turns the knob 115 counter-clockwise, to thereby disengage the detent member 119 from the bar 109 and thus permit the latter to swing inwardly and in so doing depress or lower the semaphore arm 104 to the position indicated in Fig. 26, at which time the free terminal of the detent member 119 drops into and seats within the notch 116, and simultaneously therewith the adjacent lug or stop 120 on the bar 109 will abut said detent member and thus limit and prevent further inward swinging movement of said bar 109 and in consequence further downward swinging movement of the semaphore arm 104. With the free terminal of the detent member 119 seating in the notch 116, as above described, the semaphore arm 104 is yieldingly maintained and retained in its depressed position, and when it is desired to return the semaphore arm 104 to its casing 97, the operator again grasps the knob 115 and turns same clockwise, thereby disengaging the free terminal of the detent member 119 from the notch 116 and thus permitting the bar 109 to swing outwardly and in so doing elevate or raise the semaphore arm 104 to its horizontal position, at which time the free terminal of the detent member 119 again drops into the notch 117, whereupon the semaphore arm is withdrawn within the casing in the manner as hereinbefore set forth.

In the present disclosure we have elected to illustrate and describe the types of direction indicators now preferred by us, but, it is to be understood that other types of direction indicators may be employed in combination with the recessed vehicle bodies herein disclosed, the present showing being merely by way of illustration, inasmuch, as the present invention broadly contemplates any type of vehicle body having a recess or groove formed therein and any type of direction indicator mounted within said recess. Furthermore, while we have shown herein the present recesses as located at certain or specific points upon the vehicle bodies, we also desire to have it understood that these recesses may be located at any other suitable or convenient points upon said bodies.

Manifestly, therefore, by mounting a direction indicator upon a vehicle body in the manner herein disclosed, the presence of such an indicator thereon will not be readily detected when the same is in a fully retracted position, inasmuch, as the indicator ordinarily blends and merges with the vehicle body, and thus will not detract from its appearance nor destroy its symmetry. Furthermore, the vehicle body may be readily cleaned without danger of dislodging the indicator as nothing can come between the latter and said body. Further the vision of the vehicle operator is not obstructed nor interfered with in any way, and further the direction indicator is theft and tamper-proof when its vehicle is parked and locked.

While, we have herein shown and described the invention with sufficient detail, to enable those skilled in the art to which it pertains, to understand the mode of construction and the principles involved, it is to be understood that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with combinations other than those shown and described.

What we claim as our invention, and desire to secure by Letters Patent is:—

1. The combination with an automotive vehicle body having a vertically disposed elongated recess with an enlarged lower end formed within one of its posts, of an anchor plate mounted upon said post adjacent the enlarged lower end of said recess, an elongated direction indicator normally seating in said recess and having an enlarged lower end portion seatable in the similarly enlarged portion of said recess, means for pivotally connecting the enlarged lower end of said indicator to said anchor plate for oscillative movement relative thereto, and means for swinging the direction indicator outwardly from said recess to selected signalling positions.

2. The combination with an automotive vehicle body having a recess formed therein, of a direction indicator comprising an anchor plate mounted upon said body adjacent one end of said recess, a casing seatable within said end and adapted to be attached to said anchor plate, a semaphore arm pivotally mounted on said casing and adapted to normally and snugly seat in said recess, and means for swinging the semaphore arm outwardly from the recess to selected signalling positions.

3. The combination with an automotive vehicle body having a recess formed therein, of a direction indicator comprising an anchor plate mounted upon said body adjacent one end of said recess, a casing seated within said end and attached to said anchor plate, a semaphore arm pivotally mounted on said casing and adapted to normally and snugly seat in said recess, means for closing said recess when said semaphore arm is in its non-signalling position, and means for swinging the semaphore arm outwardly from the recess to selected signalling positions.

ROBERT ANDERSON.
SAMUEL ANDERSON.